(12) United States Patent
Kugumiya et al.

(10) Patent No.: US 10,145,324 B2
(45) Date of Patent: Dec. 4, 2018

(54) FUEL INJECTION DEVICE OF INTERNAL COMBUSTION ENGINE

(71) Applicant: HONDA MOTOR CO., LTD., Tokyo (JP)

(72) Inventors: Yohei Kugumiya, Wako (JP); Atsushi Kurauchi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 238 days.

(21) Appl. No.: 15/074,595

(22) Filed: Mar. 18, 2016

(65) Prior Publication Data

US 2016/0326977 A1    Nov. 10, 2016

(30) Foreign Application Priority Data

May 8, 2015 (JP) ................................ 2015-095674

(51) Int. Cl.
| | | |
|---|---|---|
| *F02D 41/20* | (2006.01) | |
| *F02D 41/04* | (2006.01) | |
| *F02D 41/06* | (2006.01) | |
| *F02N 11/08* | (2006.01) | |
| *F02N 19/00* | (2010.01) | |

(52) U.S. Cl.
CPC ........... *F02D 41/20* (2013.01); *F02D 41/042* (2013.01); *F02D 41/062* (2013.01); *F02D 41/064* (2013.01); *F02D 2041/2006* (2013.01); *F02D 2200/503* (2013.01); *F02N 11/0814* (2013.01); *F02N 19/00* (2013.01); *F02N 2250/02* (2013.01); *Y02T 10/7005* (2013.01)

(58) Field of Classification Search
CPC ...... F02D 41/20; F02D 41/042; F02D 41/062; F02D 41/064; F02D 2041/2006; F02D 2200/503; F02N 11/0814; F02N 19/00; F02N 2250/02
See application file for complete search history.

(56) References Cited

U.S. PATENT DOCUMENTS

| | | | | |
|---|---|---|---|---|
| 6,320,358 B2 * | 11/2001 | Miller | ................... | H02J 7/1423 307/10.1 |
| 8,506,448 B2 * | 8/2013 | Hokoi | ................... | B60K 6/445 477/3 |
| 8,631,887 B2 * | 1/2014 | Teraya | .................. | B60W 10/26 180/65.275 |

(Continued)

FOREIGN PATENT DOCUMENTS

JP        2014-009627 A    1/2014

*Primary Examiner* — Hai Huynh
*Assistant Examiner* — Gonzalo Laguarda
(74) *Attorney, Agent, or Firm* — Chip Law Group

(57) ABSTRACT

A step-down circuit is connected to an output of a step-up circuit that steps up a battery voltage, and an output of the step-down circuit is connected to a power supply input terminal of a CPU via an FET. The step-down circuit is normally maintained in an inactive state and, in response to an ignition switch being turned off, the CPU causes the step-down circuit to actuate and a stepped-down voltage (equal to a stabilized voltage) is output from the step-down circuit. The stepped-down voltage is further stepped down to a CPU power supply voltage, and the CPU power supply voltage is supplied to the power supply input terminal of the CPU. This allows the residual charge of the step-up circuit to be dissipated by the step-down circuit and the CPU.

10 Claims, 4 Drawing Sheets

(56) References Cited

U.S. PATENT DOCUMENTS

| | | | | |
|---|---|---|---|---|
| 9,228,526 B2* | 1/2016 | Nishimura | .......... | F02D 41/3005 |
| 2003/0155814 A1* | 8/2003 | Gronbach | .......... | B60L 11/1868 |
| | | | | 307/130 |
| 2009/0206660 A1* | 8/2009 | Makita | .................. | H02J 7/1423 |
| | | | | 307/9.1 |
| 2016/0207403 A1* | 7/2016 | Iida | ........................ | B60L 11/02 |

* cited by examiner

FUEL INJECTION DEVICE OF INTERNAL COMBUSTION ENGINE

CROSS REFERENCES TO RELATED APPLICATIONS

The present application claims priority under 35 U.S.C. § 119 to Japanese Patent Application No. 2015-095674, filed May 8, 2015, entitled "Fuel Injection Device of Internal Combustion Engine." The contents of this application are incorporated herein by reference in their entirety.

BACKGROUND

1. Field

The present disclosure relates to a fuel injection device having a fuel injection valve that injects fuel directly into a combustion chamber of an internal combustion engine and, in particular, to a fuel injection device having a step-up circuit that steps up an output voltage of a battery for driving the fuel injection valve.

2. Description of the Related Art

The related art discloses a fuel injection device having a fuel injection valve for injecting fuel directly into a combustion chamber of an internal combustion engine and a step-up circuit for stepping up a battery voltage (see, for example, Japanese Unexamined Patent Application Publication No. 2014-9627). The step-up circuit includes an inductor, a switching element, a diode, and a capacitor, in which the switching element is switched on and off to step up the voltage of the capacitor and output a stepped-up voltage.

During an operation of an internal combustion engine, a capacitor of a step-up circuit is applied with a voltage of around 40 V, for example, and charge is accumulated therein. Although an ignition switch is turned off, the charge accumulated in the capacitor is not immediately dissipated, and it takes several tens of minutes before the charge is fully dissipated. Therefore, when it is necessary to start a maintenance operation within a relatively short time after the ignition switch is turned off, for example, electric shock of an operator needs to be prevented.

SUMMARY

In view of the above background, the present application describes a fuel injection device that is able to properly dissipate the accumulated charge in a capacitor of a step-up circuit by discharging the capacitor after an ignition switch is turned off and thus enhance safety of an operator when a maintenance operation is started within a relatively short time from turning off the ignition switch.

A first aspect of the embodiment is a fuel injection device of an internal combustion engine. The device includes a fuel injection valve that injects fuel directly into a combustion chamber of the internal combustion engine; a control computing unit that controls operation of the fuel injection valve; a battery; a step-up circuit that is connected to the battery and steps up a battery output voltage to output a stepped-up voltage; and a discharging circuit that is connected to an output side of the step-up circuit and causes residual charge in the step-up circuit to be rapidly dissipated when an ignition switch for turning on and off a power supply voltage supplied to the control computing unit is turned off.

According to this configuration, in response to the ignition switch being turned off, the residual charge of the step-up circuit is rapidly dissipated by the discharging circuit. Therefore, when a maintenance operation is started within a relatively short time after the ignition switch is turned off, safety of an operator is enhanced.

In a second aspect of the embodiment, in the fuel injection device of the internal combustion engine of the first aspect, the discharging circuit may be formed of a step-down circuit that steps down the stepped-up voltage to output a stepped-down voltage and a circuit including the control computing unit, and the control computing unit may use the stepped-down voltage as a power supply voltage for performing a shutdown process after the ignition switch is turned off.

According to this configuration, the residual charge of the step-up circuit is dissipated by the circuit including the step-down circuit that steps down the stepped-up voltage to output the stepped-down voltage and the control computing unit. Furthermore, the stepped-down voltage is used to power the shutdown process after the ignition switch is turned off. Therefore, the residual charge of the step-up circuit can be effectively utilized while being dissipated.

In a third aspect of the embodiment, in the fuel injection device of the internal combustion engine of the second aspect, the control computing unit may cause the step-down circuit to actuate when the engine is restarted during an idling-stop operation that temporarily stops the engine and may use the stepped-down voltage as a power supply voltage.

According to this configuration, when the engine is restarted during an idling-stop operation, the stepped-down voltage output from the step-down circuit is used as the power supply voltage to the control computing unit. At starting of the engine, there is a likelihood that an inrush current from the battery to a starter motor may cause a temporary reduction in the battery voltage. In this regard, the step-down circuit is actuated, and the stepped-down voltage is used as the power supply voltage to the control computing unit, which can prevent the control operation of the control computing unit from being unstable or being reset.

In a fourth aspect of the embodiment, in the fuel injection device of the internal combustion engine of the second or third aspect, the control computing unit may cause the step-down circuit to actuate when the engine is started at a low temperature and may use the stepped-down voltage as a power supply voltage.

According to this configuration, when the engine is started at a low temperature, the stepped-down voltage output from the step-down circuit is used as the power supply voltage to the control computing unit. During starting at a low temperature, the load of a starter motor tends to be large, and there is a likelihood that an inrush current to the starter motor may cause a temporary reduction in the battery voltage. In this regard, the step-down circuit is activated and the stepped-down voltage is used as the power supply voltage to the control computing unit, which can prevent the control operation of the control computing unit from being unstable or being reset.

DESCRIPTION OF THE EMBODIMENTS

The embodiment of the present application will be described below with reference to the drawings.

Figure 1:
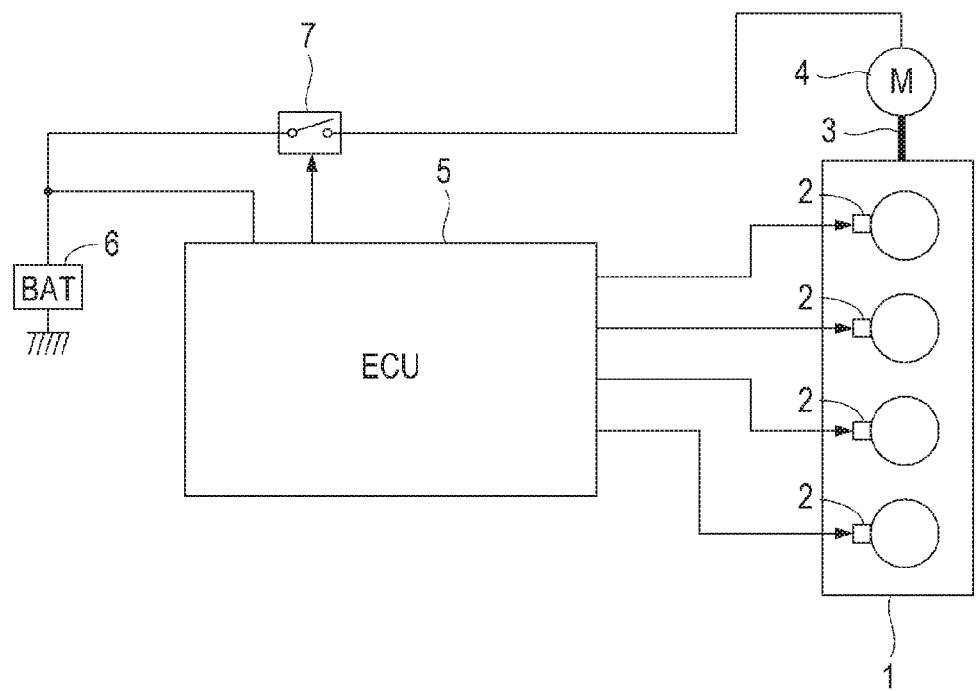
FIG. 1 is a diagram illustrating an internal combustion engine and its fuel injection device according to one embodiment of the present application.

FIG. 1 illustrates an internal combustion engine (hereafter, referred to as "engine") 1 and its fuel injection device according to one embodiment of the present application, in which a 4-cylinder engine 1 includes four fuel injection valves 2 corresponding to respective cylinders. Each of the fuel injection valves 2 injects fuel directly into a combustion chamber of the engine 1.

A starter motor 4 is provided so as to be able to drive a crank shaft 3 of the engine 1 and is connected to a battery 6 via a switch circuit 7. Driving electric power is supplied from the battery 6 to the starter motor 4. The switch circuit 7 is connected to an electric control unit (hereafter, referred to as "ECU") 5, and switching on/off of the switch circuit 7 is controlled by the ECU 5. That is, the ECU 5 actuates the starter motor 4 by turning on the switch circuit 7 when starting the engine 1 and, after the engine 1 starts self-sustaining operation, stops the starter motor 4 by turning off the switch circuit 7.

The four fuel injection valves 2 are connected to the ECU 5, respectively, and the ECU 5 controls the operation of the fuel injection valves 2. The battery 6 is connected to the ECU 5, and electric power for operating the ECU 5 and electric power for driving the fuel injection valves 2 are supplied from the battery 6.

Figure 2:
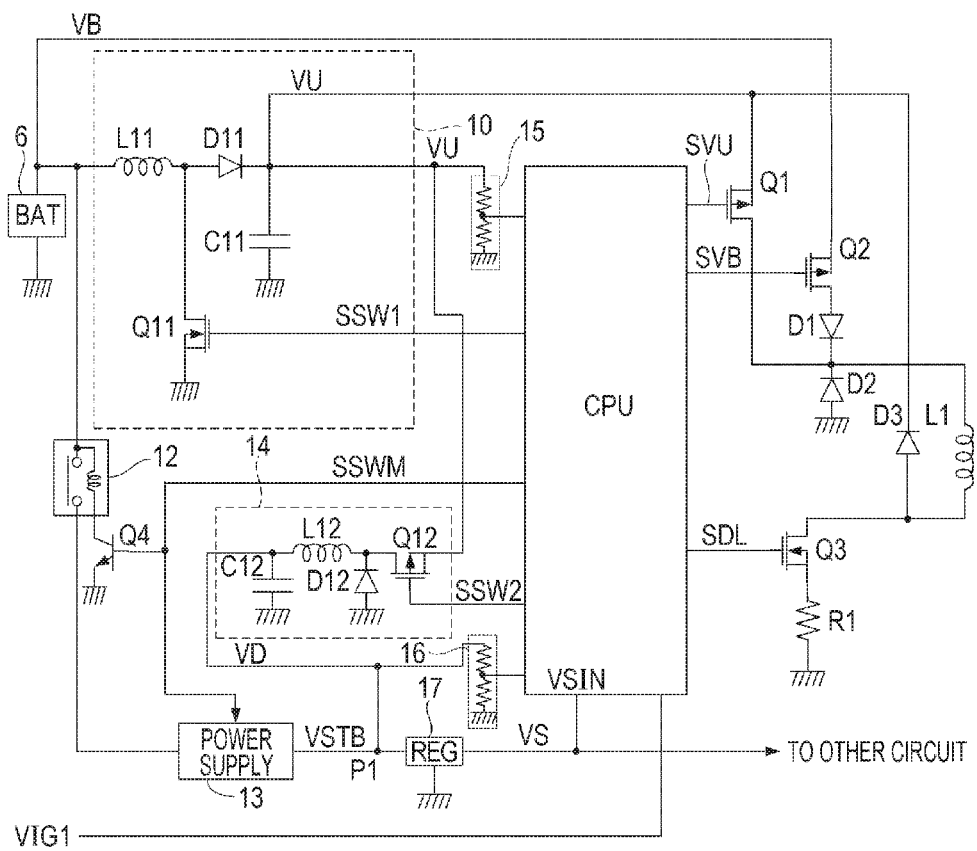
FIG. 2 is a circuit diagram for illustrating a configuration of a fuel injection valve driving unit included in an electronic control unit illustrated in FIG. 1.

FIG. 2 is a circuit diagram for illustrating a configuration of a fuel injection valve driving unit included in the ECU 5 and shows a circuit configuration for supplying a driving current to a solenoid L1 that drives one of the cylinders of the fuel injection valves 2. Other circuits for driving other cylinders of the fuel injection valves 2 are configured in a similar manner.

The fuel injection valve driving unit illustrated in FIG. 2 includes field effect transistors (hereafter, referred to as "FET(s)") Q1 and Q2 as switching elements for switching a power supply voltage supplied to one end of the solenoid L1, an FET Q3 as a switching element for switching connection/disconnection between the other end of the solenoid L1 and the ground, diodes D1 to D3, a resistor R1, a step-up circuit 10, a CPU (Central Processing Unit) 11, a relay 12, a power supply circuit 13, a step-down circuit 14, a transistor Q4, resistor dividing circuits 15 and 16, and a three-terminal regulator 17. Control signals are supplied from the CPU 11 to the FETs Q1 to Q3, the transistor Q4, the step-up circuit 10, the power supply circuit 13, and the step-down circuit 14.

The step-up circuit 10 is a circuit that steps up an output voltage VB (for example, 12 V) of the battery 6 to output a stepped-up voltage VU (for example, 40 V) and includes a series circuit of an inductor L11 and a diode D11 (hereafter, referred to as "LD series circuit"), a capacitor C11, and an FET Q11. More specifically, one end of the LD series circuit is connected to the battery 6, the other end of the LD series circuit is connected to one end of the capacitor C11, the other end of the capacitor C11 is grounded, the FET Q11 is connected between the ground and a connecting point of the inductor L11 and the diode D11, and the stepped-up voltage VU is output from the one end of the capacitor C11.

The output of the step-up circuit 10 is connected to the CPU 11 via the resistor dividing circuit 15, and the CPU 11 supplies to the gate of the FET Q11 an on/off switching signal SSW1 that is based on the stepped-up voltage VU. The CPU 11 controls a duty ratio DTY1 of the on/off switching signal SSW1 such that the stepped-up voltage VU becomes equal to a set voltage VUX (for example, 40 V).

The power supply circuit 13 is formed of a switching regulator and stabilizes the battery output voltage VB to output a stabilized voltage VSTB (for example, 6.5 V).

The step-down circuit 14 is a circuit that steps down the stepped-up voltage VU to output a stepped-down voltage VD that is equal to the stabilized voltage VSTB, and includes a capacitor C12, an inductor L12, a diode D12, and a FET Q12. The output of the step-down circuit 14 is connected to the CPU 11 via the resistor dividing circuit 16, and the CPU 11 supplies to the gate of the FET Q12 an on/off switching signal SSW2 that is based on the stepped-down voltage VD. The CPU 11 controls a duty ratio DTY2 of the on/off switching signal SSW2 such that the stepped-down voltage VD becomes equal to a set voltage VDX (for example, 6.5 V).

The step-down circuit 14 is not configure to operate continuously and is controlled by the CPU 11 so as to actuate immediately after an ignition switch (not shown) is turned off, when the engine 1 is started at a low temperature, and when the engine 1 is restarted immediately after the end of the idling-stop operation. The step-down circuit 14 is kept in an inactive state by maintaining the FET Q12 of the step-down circuit 14 in an off-state.

The relay 12 is provided between the battery 6 and the power supply circuit 13 and, when the relay 12 is switched on, the battery voltage VB is supplied to the power supply circuit 13. The transistor Q4 is connected to a driving coil of the relay 12 and, when the transistor Q4 is switched on, a current is supplied to the driving coil and thereby the relay 12 is switched on. The base of the transistor Q4 and the power supply circuit 13 are supplied with a power supply switching signal SSWM from the CPU 11.

The output of the power supply circuit 13 is connected to the output of the step-down circuit 14 at a connecting point P1, and the three-terminal regulator 17 is arranged between the connecting point P1 and a power supply input terminal VSIN of the CPU 11. The three-terminal regulator 17 reduces the stabilized voltage VSTB to a CPU power supply voltage VS (for example, 5 V) and outputs it. The CPU power supply voltage VS is also supplied to other circuits (other CPUs, transistors, and the like) included in the ECU 5.

The battery voltage VB is supplied to one end of the solenoid L1 via the FET Q2 and the diode D1, and the stepped-up voltage VU is supplied to the one end of the solenoid L1 via the FET Q1. The other end of the solenoid L1 is grounded via the FET Q3 and the resistor R1, and the diode D3 is arranged between the other end of the solenoid L1 and the output of the step-up circuit 10.

The CPU 11 is supplied with an IG switching voltage VIG1. The IG switching voltage VIG1 becomes equal to the battery voltage VB when the ignition switch is turned on and becomes "0" when the ignition switch is turned off.

The gates of the FETs Q1 to Q3 are connected to the CPU 11 and supplied with a step-up voltage control signal SVU, a battery voltage control signal SVB, and a low-side control signal SDL, respectively. The CPU 11 controls switching on/off of the FETs Q1 to Q3 to control the driving current supplied to the solenoid L1 and to open and close the fuel injection valve 2. A signal instructing a fuel injection timing and a fuel injection time period in the fuel injection valve 2 is supplied from another CPU (not shown).

Figure 3:
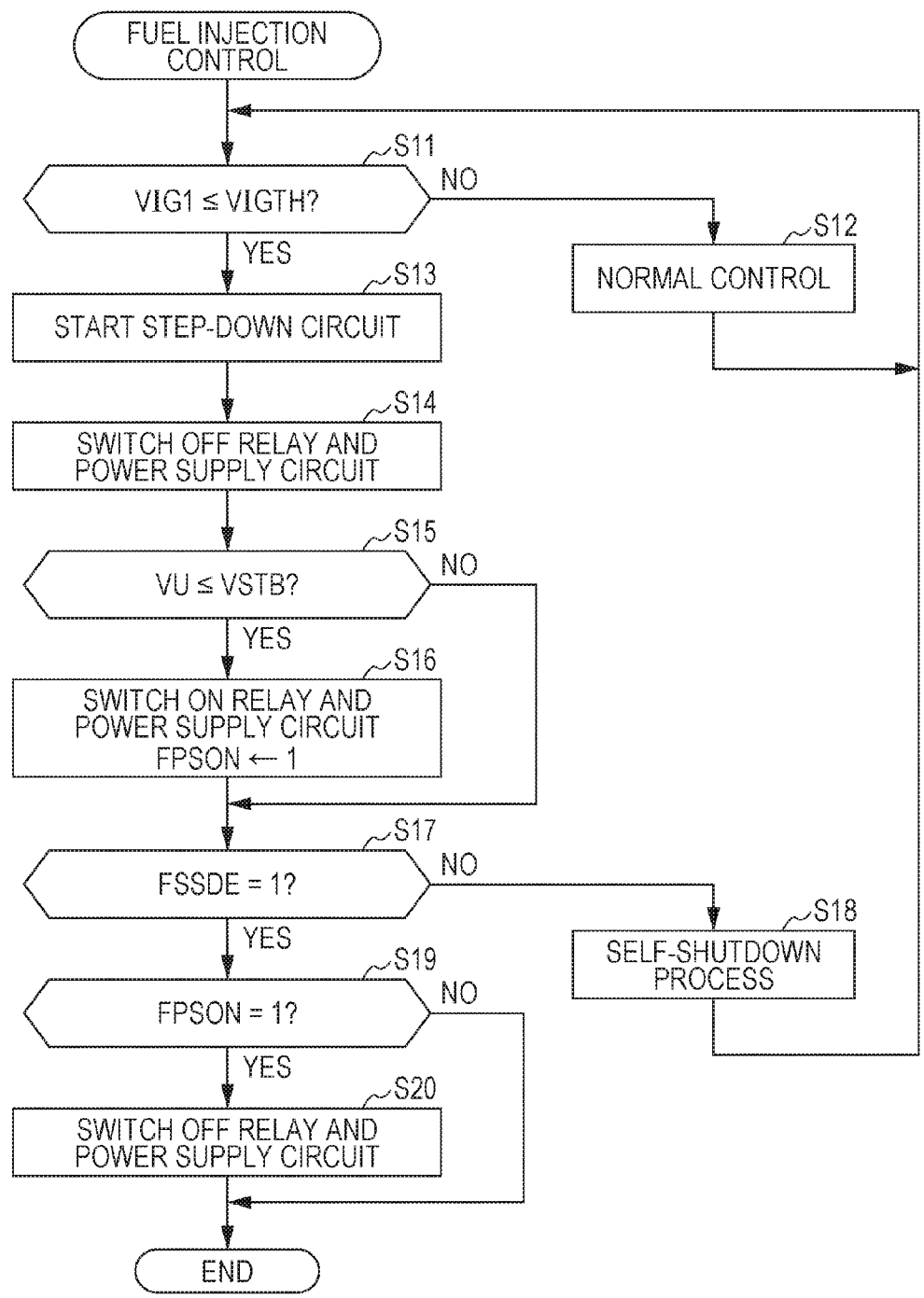
FIG. 3 is a flowchart of a fuel injection control.

FIG. 3 is a flowchart of a fuel injection control system in the present embodiment, and the process of the fuel injection control is performed by the CPU 11. FIG. 3 is, in particular, a flowchart for illustrating a process when the ignition switch is turned off.

At step S11, it is determined whether or not the IG switching voltage VIG1 is less than or equal to an off-determination threshold VIGTH (for example, 2 V) and, if NO is determined and when the ignition switch is in an on-state, a normal control (a fuel injection control by the fuel injection valve 2) is applied (step S12). If YES is determined at step S11, step S13 is entered and the step-down circuit 14 is started (if the step-down circuit 14 has already been started (when the process returns from step S18 to step S11), the operating state is maintained). Note that, when the ignition switch is turned off, the FET Q11 of the step-up circuit 10 is maintained in an off-state.

Even when the output of the stabilized voltage VSTB from the power supply circuit 13 is stopped, the step-down circuit 14 is actuated, and thereby the stepped-down voltage VD that is equal to the stabilized voltage VSTB is output from the step-down circuit 14. Therefore, the CPU 11 is able to continue its operation, and the residual charge of the capacitor C11 of the step-up circuit 10 can be dissipated (consumed).

At step S14, the power supply switching signal SSWM is set to a low level to switch off the relay 12 and the power supply circuit 13 and, at step S15, it is determined whether or not the stepped-up voltage VU is less than or equal to the stabilized voltage VSTB. Because the stepped-up voltage VU that is the output voltage of the step-up circuit 10 gradually decreases, No is typically determined at step S15 immediately after the ignition switch is turned off, and step S17 is then entered.

On the other hand, if YES is determined at step S15 for some reason (for example, when the stepped-up voltage VU is low at the turning off of the ignition switch, when the charge amount of the capacitor C11 is small, when there is a failure, or the like), step S16 is entered and the power supply switching signal SSWM is set to a high level to switch on the relay 12 and the power supply circuit 13. At this time, a power supply-on flag FPSON indicating that the power supply circuit 13 has been switched off and then switched on again is set to "1".

At step S17, it is determined whether or not a self-shutdown end flag FSSDE is "1". The self-shutdown end flag FSSDE is set to "1" when the associated process ends in the self-shutdown process performed at step S18. Therefore, No is initially determined at step S17, and step S18 is entered and the self-shutdown process is performed. In the self-shutdown process, active processes are terminated in a predetermined order and, when all the processes other than the self-shutdown process have been terminated, the self-shutdown end flag FSSDE is set to "1". Once the self-shutdown end flag FSSDE is set to "1", the determination of step S17 becomes YES, and step S19 is entered and it is determined whether or not the power supply-on flag FPSON is "1".

If NO is determined at step S19, the process is immediately terminated. If YES is determined at step S19, the power supply signal SSWM is set to a low level to switch off the relay 12 and the power supply circuit 13 (step S20), and then the process ends.

Figure 4:
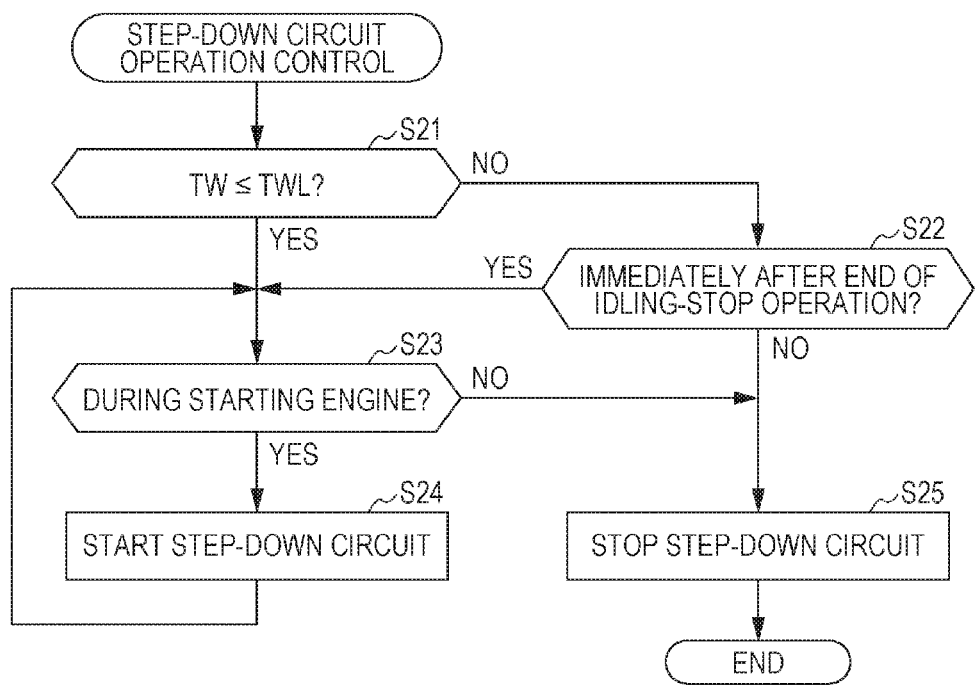
FIG. 4 is a flowchart of a step-down circuit operating control applied during a normal control.

FIG. 4 is a flowchart of a step-down circuit operation control applied during the normal control illustrated in FIG. 3. Note that, when predetermined conditions are met in a vehicle in which the engine 1 of the present embodiment is mounted (for example, when the vehicle speed is substantially "0" and a brake pedal is depressed, the charge of the battery 6 is above a threshold and warming-up of the engine 1 has been completed), an idling-stop operation to temporarily stop the engine 1 is performed.

At step S21, it is determined whether or not a cooling water temperature TW of the engine 1 that is detected by an engine cooling water sensor (not shown) is less than or equal to a low temperature determination value TWL (for example, 10 degrees Celsius). If NO is determined at step S21, it is then determined whether or not the process is immediately after the end of the idling-stop operation (step S22). If YES is determined at step S21 and S22, it is then determined whether or not the process is during a starting of the engine 1 (during an operation of the starter motor 4) (step S23).

If YES is determined at step S23, the step-down circuit 14 is started (when already started, the operating state is maintained) (step S24). Upon completion of starting of the engine 1, the process enters step S25 from step S23 and stops the operation of the step-down circuit 14. If NO is determined at step S22, the suspended state of the step-down circuit 14 is maintained (step S25).

As described above, in the present embodiment, in response to the ignition switch being turned off, the residual charge of the step-up circuit 10, more particularly, the residual charge of the capacitor C11 is rapidly dissipated by the step-down circuit 14 and the circuit including the CPU 11 that function as a discharging circuit. Therefore, when it is necessary to start a maintenance operation within a relatively short time after turning off the ignition switch, safety of an operator is enhanced.

Further, the step-down circuit 14 is started in response to the ignition switch being turned off, the stepped-up voltage VU is stepped down, the stepped-down voltage VD that is equal to the stabilized voltage VSTB is output by the step-down circuit 14, the stepped-down voltage VD is converted to the power supply voltage VS by the three-terminal regulator 17, and the power supply voltage VS is then supplied to the CPU 11 and other circuits of the ECU 5. The CPU 11 is able to use the power supply voltage VS to perform the shutdown process after the ignition switch is turned off so that the residual charge of the step-up circuit 10 can be effectively utilized while being dissipated.

Further, when the engine 1 is restarted during an idling-stop operation and when the engine 1 is started at a low temperature, the step-down circuit 14 is started and the stepped-down voltage VD is output. When starting the engine 1, there is likelihood that an inrush current from the battery 6 to the starter motor 4 may cause a reduction in the battery voltage VB. In this regard, the step-down circuit 14 is actuated to supply the stepped-down voltage VD (equal to VSTB) as a power supply voltage to the CPU 11, which can prevent the control operation of the CPU 11 from being unstable or being reset due to a temporary reduction of the stabilized voltage VSTB output from the power supply circuit 13.

In the present embodiment, the CPU 11 corresponds to a control computing unit, and the step-down circuit 14 and the CPU 11 form a discharging circuit.

Note that the embodiment is not limited to the embodiment described above, and various modifications are possible. For example, although the step-down circuit 14 is actuated when the engine 1 is restarted immediately after the end of the idling-stop operation and when the engine 1 is started at a low temperature in the embodiment described above, the step-down circuit 14 may be actuated at either one of the timings when the engine 1 is restarted immediately after the end of the idling-stop operation and when the engine 1 is started at a low temperature.

Further, the stabilized voltage VSTB and the stepped-down voltage VD are set to a voltage higher than the CPU power supply voltage VS and stepped down by the three-terminal regulator 17 to obtain the CPU power supply voltage VS in the embodiment described above. Alternatively, the stabilized voltage VSTB and the stepped-down voltage VD may be set to the same voltage as the CPU power supply voltage VS, and the connecting point P1 of FIG. 2 may be directly connected to the power supply input terminal VSIN.

What is claimed is:

1. A fuel injection device of an internal combustion engine, the fuel injection device comprising:
    a fuel injection valve that injects fuel directly into a combustion chamber of the internal combustion engine;
    a central processing unit (CPU) configured to control operation of the fuel injection valve;
    a battery;
    a step-up circuit that is connected to the battery, wherein the step-up circuit is configured to step up a battery output voltage of the battery to output a stepped-up voltage to drive the fuel injection valve; and
    a step-down circuit that is connected to an output side of the step-up circuit, wherein the step-down circuit is configured to dissipate residual charge in the step-up circuit when an ignition switch is turned off, and wherein the ignition switch turns on or turns off a first power supply voltage supplied to the CPU.

2. The fuel injection device according to claim 1,
    wherein the step-down circuit is configured to step down the stepped-up voltage to output a stepped-down voltage, wherein the step-down circuit includes a circuit including the CPU, and
    wherein the CPU is configured to use the stepped-down voltage as a second power supply voltage for performing a shutdown process after the ignition switch is turned off.

3. The fuel injection device according to claim 2, wherein the CPU is configured to actuate the step-down circuit when the internal combustion engine is restarted during an idling-stop operation that temporarily stops the internal combustion engine, and use the stepped-down voltage as the second power supply voltage.

4. The fuel injection device according to claim 2, further comprising a sensor to detect a temperature of the internal combustion engine,
    wherein the CPU is configured to:
        actuate the step-down circuit when the internal combustion engine is started at the detected temperature that is lower than a threshold value; and
        use the stepped-down voltage as the second power supply voltage.

5. The fuel injection device according to claim 4, wherein the threshold value is 10 degrees Celsius.

6. A fuel injection method for an internal combustion engine, the method comprising:
    injecting fuel, by a fuel injection valve, into a combustion chamber of the internal combustion engine;
    controlling, by a central processing unit (CPU), operation of the fuel injection valve;
    stepping-up, by a step-up circuit that is connected to a battery, a battery output voltage to output a stepped-up voltage to drive the fuel injection valve; and
    dissipating, by a step-down circuit that is connected to an output side of the step-up circuit, a residual charge in the step-up circuit when an ignition switch is turned off, wherein the ignition switch turns on or turns off a first power supply voltage supplied to the CPU.

7. The method according to claim 6,
    wherein the step-down circuit steps down the stepped-up voltage to output a stepped-down voltage, wherein the step-down circuit includes a circuit including the CPU, and
    wherein the CPU uses the stepped-down voltage as a second power supply voltage for performing a shutdown process after the ignition switch is turned off.

8. The method according to claim 7, further comprising actuating, by the CPU, the step-down circuit when the internal combustion engine is restarted during an idling-stop operation that temporarily stops the internal combustion engine, and using the stepped-down voltage as the second power supply voltage.

9. The method according to claim 7, further comprising:
    detecting, by a sensor, a temperature of the internal combustion engine; and
    actuating, by the CPU, the step-down circuit when the internal combustion engine is started at the detected temperature that is lower than a threshold value, and using the stepped-down voltage as the second power supply voltage.

10. The method according to claim 9, wherein the threshold value is 10 degrees Celsius.

* * * * *